United States Patent [19]
Lee

[11] Patent Number: 5,374,076
[45] Date of Patent: Dec. 20, 1994

[54] VEHICLE SUSPENSION SYSTEM FOR A STEERABLE WHEEL

[75] Inventor: Unkoo Lee, Anyang, Rep. of Korea

[73] Assignee: Hyundai Motor Company, Seoul, Rep. of Korea

[21] Appl. No.: 165,596

[22] Filed: Dec. 13, 1993

[30] Foreign Application Priority Data

Dec. 14, 1992 [KR] Rep. of Korea ............... 92-24236

[51] Int. Cl.$^5$ ............................................. B60G 3/00
[52] U.S. Cl. ........................................ 280/691; 280/673; 280/670; 280/696
[58] Field of Search ............... 280/673, 675, 660, 670, 280/688, 690, 691, 696, 666

[56] References Cited

U.S. PATENT DOCUMENTS

| | | | |
|---|---|---|---|
| 2,734,253 | 2/1956 | Lind | 280/673 |
| 4,871,187 | 10/1981 | Schaible | 280/670 X |
| 5,000,477 | 3/1991 | Minakawa et al. | 280/690 |

FOREIGN PATENT DOCUMENTS 3054011  3/1991  Japan ............................ 280/673

*Primary Examiner*—Mitchell J. Hill
*Assistant Examiner*—Christopher P. Ellis
*Attorney, Agent, or Firm*—Birch, Stewart, Kolasch & Birch

[57] ABSTRACT

A vehicle suspension system for a steerable wheel includes a strut arm disposed vertically with respect to a vehicle body, and connected to a vehicle body by an insulator connecting part, a connecting arm of the strut arm projecting toward a wheel at a lower part of the strut arm. A pair of upper arms are connected between the vehicle body and a vehicle body side part of the connecting arm at both side ends. A steering knuckle rotatably supports the wheel by being connected to the wheel side of the connecting arm at the upper end by a ball joint, and a tie rod steerably connected to the steering knuckle. A pair of lower arms are pivotally connected to the vehicle body at the vehicle side ends and connected to a wheel side lower part of the steering knuckle at wheel side ends by ball joints.

9 Claims, 4 Drawing Sheets

FIG.3
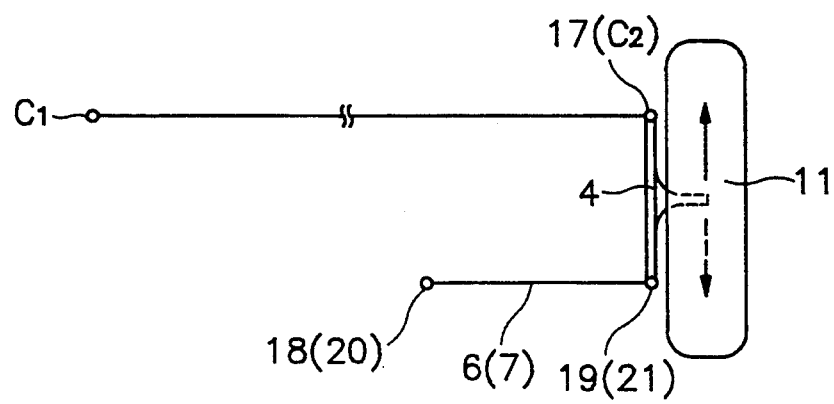
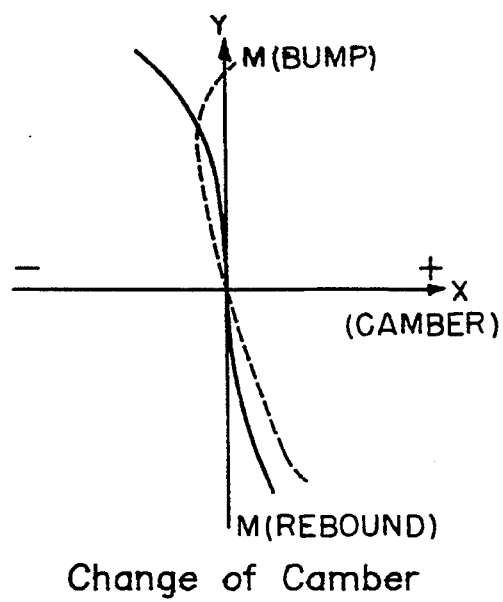
FIG.4A
Change of Camber
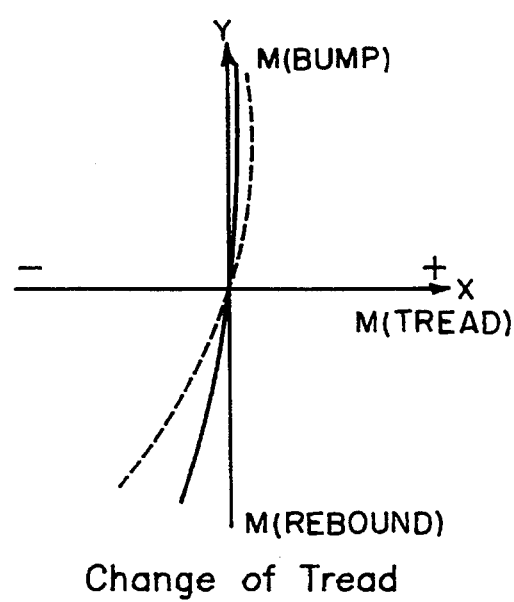
FIG.4B
Change of Tread

VEHICLE SUSPENSION SYSTEM FOR A STEERABLE WHEEL

BACKGROUND OF THE INVENTION

1. Field of the Invention

The present invention relates to a vehicle suspension system for a steerable wheel. More particularly, it relates to a vehicle suspension system for a steerable wheel which will enhance a free layout degree by making it easy to provide an imaginary kingpin axis and imaginary links, and to reduce the change ratio of a height of a roll center, and as a result, can improve all sorts of safety such as straight ahead safety by reducing responsiveness with respect to the steering operation.

2. Description of Related Art

In general, a vehicle suspension system for a steerable wheel connects a shaft and a frame to each other, and absorbs vibrations and impacts from a road surface while the vehicle is running, and so, a safer vehicle and improved ride comfort can be obtained.

To absorb impacts, a vehicle suspension system should be connected flexibly in a vertical direction, and to endure driving force, braking force and centrifugal force generated at a wheel during the vehicle's turning, a vehicle suspension should be connected firmly in a horizontal direction.

The vehicle suspension system is classified structurally as an axle integral suspension system and an independent suspension system. While an axle integral suspension system is applied to a large vehicle like buses, trucks and rear axles of passenger cars, an independent suspension system is applied mainly to an axle of a passenger car. To improve ride comfort and running safety, an independent suspension is bisected to act independently.

Among these suspension systems, the present invention relates to an independent suspension system.

There are many kinds of independent suspension systems. As a suspension system applied to a steerable wheel, Macpherson type and Wishbone type are applied widely.

A vehicle suspension system for a steerable wheel is designed to control a position of a wheel with respect to the vehicle body to obtain a better positioning in a vehicle operation as well as absorb vibrations or impacts. The axle is thereby prevented from directly transmitting an impact or vibration from a road surface to the vehicle body, so that optimal handling safety and running safety can be obtained.

The front wheel is mounted to be changeable in its direction from right to left or from left to right, centering the kingpin, and is also mounted with a geometrical angle to meet the front suspension requisites.

Mounting the front wheel with the geometrical angle is called wheel alignment. The wheel alignment is determined by several elements, but the optimal operation of the front wheel is achieved by the supplemental operation of the elements with respect to each other.

A kingpin inclination among the elements reduces the handling force of a steering wheel with a camber, absorbs any impact generated from the vehicle motion and then increases restitution force of the steering wheel. The turning safety of the straight ahead position of the vehicle and the handling safety in a vehicle's turning position are thereby obtained.

The kingpin inclination is such that the kingpin is set up with its central line lying at a predetermined angle with respect to the vertical line when the vehicle is viewed from the front.

An interval between the central line of the kingpin and a central line of the wheel is called an offset, and as the offset gets smaller, the responsiveness to a steering operation becomes reduced to improve the handling safety during the vehicle's turning or braking.

Vibrations have something to do with the vehicle safety. Rolling, pitching, yawing as well as bounce occur in a vehicle during the vehicle's driving. Only if these vibrations are absorbed softly, can ride comfort and safety be improved.

As the vibration of a vehicle is concerned, vibration generated when the vehicle is turning is defined as rolling, which means that a vehicle vibrates in the left-and-right directions, and rolling has an important effect upon cornering safety.

A certain basic point where rolling occurs is called a roll center (RC). Rolling occurs because the centroid of a vehicle is higher than a roll center. Accordingly, the greater the change in the height of a roll center, the more the gravity of a vehicle moves. Therefore, this phenomenon results in a greater slip angle, so the running safety and the handling safety get worse.

To ensure running safety, the variation ratio of the height of RC is desired to be minimized.

Considering the above, the conventional suspension system is described in detail hereinafter.

FIG. 5A illustrates a general Macpherson type suspension system, including a strut arm 53 formed integrally to a steering knuckle 51, provided with a shock absorber 52 inward, a spring 54, a control arm 55, and a ball joint 56.

This suspension system has some advantages of simple structure, a small spring, light mass, and a small effective volume or an engine room.

But in order to make the kingpin offset ($\alpha$) reduced or negative (−), an upper supporting point 57 of the strut arm 53 should be displaced toward the engine room, or the wheel side end of the control arm 55 connected to the ball joint 56 should be displaced outside.

However, if the upper supporting point 57 of the strut arm 53 is displaced toward the engine room, the effective volume of an engine room is reduced and the kingpin angle ($\alpha$) becomes excessively large only to have a bad effect on cornering safety of a vehicle.

If the wheel side end of the control arm 55 connected to the ball joint 56 is moved outside, it is actually impossible to reduce the kingpin offset ($\alpha$) because it will interfere with a brake disk attached to a wheel 58.

The change of a camber angle and tread is illustrated by a dotted line in FIGS. 4A and 4B, so the running safety and the cornering safety get worse.

FIG. 5B illustrates a general Wishbone type suspension system, including upper and lower control arms 61, 62, a steering knuckle 63, a spring assembly 65 including a shock absorber 64 and ball joints 66, 67 connecting the upper and lower control arms 61, 62 to the steering knuckle 63.

To adjust the kingpin offset ($\alpha$), a vehicle body side connecting point 68 of the upper control arm 61 should be displaced toward the engine room, or the ball joint 67 of the lower control arm 62 should be displaced outside.

But, in a Wishbone type suspension system, as well as Macpherson type suspension system, if the vehicle body side connecting point 68 of the upper control arm 61 is displaced toward the engine room, the effective volume of an engine room is reduced and the kingpin angle ($\alpha$) becomes excessively large to adversely affect cornering safety of a vehicle, and if the ball joint 67 of the lower control arm 62 is displaced outside, it is actually impossible to reduce the kingpin offset ($\alpha$) because it will interfere with a brake disk attached to the wheel 69.

SUMMARY OF THE INVENTION

As noted above, the conventional Macpherson type suspension and Wishbone type suspension have a limitation to improve the function of suspension systems, because a free layout degree to provide a kingpin angle is limited to such a tiny bound that it is impossible to reduce the size of a kingpin offset. Besides, since the vertical motion of a wheel is actuated by short control arms in any type, a great change in the height of a roll center makes running safety worse.

In view of such problems of the conventional technology, the present invention is provided. A primary object of the invention is to improve the handling safety by minimizing a change ratio of a height of a roll center based on setting up an imaginary kingpin axis easily and establishing imaginary links. Another object of the invention is to enhance a free layout degree by setting up a change in camber and tread independently to a kingpin axis. A further object of the present invention is also to improve all aspects of vehicle safety as well as straight ahead safety by reducing a responsiveness with respect to a steering operation.

As a multi-link suspension system that is a mixed system of a Macpherson type and Wishbone type, a suspension system of the present invention maximizes advantages of both types of suspension systems.

The present invention provides a multi-link type suspension system comprising a strut arm disposed vertically with respect to a vehicle body, including a connecting arm projecting outward at a lower part, and the strut arm having an upper part elastically connected to the vehicle body by an insulated connecting part; a pair of upper arms having both side connecting points pivotally connected to the vehicle body and an inner-side of the connecting arm; a steering knuckle for rotatably supporting a wheel, having an upper end connected to an outer end of the connecting arm, and steerably connected to a steering tie rod; a pair of lower arms having vehicle body side connecting points pivotally connected to the vehicle body wheel side ends connected to a lower-inward portion of the steering knuckle by a ball joint.

The upper arms are positioned parallel to each other with a certain interval. Wheel side connecting points of the lower arms are focused on a lower part of the steering knuckle in the same plane, but vehicle side connecting points are widened and connected to the vehicle body.

The connecting point where the connecting arm is connected to the steering knuckle is corresponding to an instantaneous arm. An intersecting point of an imaginary line extending the upper arm toward the vehicle body with an imaginary line that is perpendicular with respect to an axis of the strut arm at an upper connecting point becomes an instantaneous center of the connecting arm with respect to the vehicle body.

An imaginary upper arm is formed into a segment line connecting the instantaneous center of the connecting arm with respect to the vehicle body and the instantaneous center of the wheel with respect to the connecting arm to each other. An imaginary kingpin axis is formed into a segment line connecting the upper connecting point of the steering knuckle to the intersecting point of both extended lines connecting both a vehicle side connecting point and a wheel side connecting point of both lower arms, respectively.

A plurality of links are connected to one another in order that an intersecting point of the imaginary upper arm with an extending line connecting both vehicle body side and wheel side connecting points of the lower arms becomes an instantaneous center of the wheel with respect to the vehicle body. A roll center is positioned at an intersecting point of an extending line connecting the instantaneous center of the wheel with respect to the vehicle body with a wheel tread with a center line of the vehicle body.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate one embodiment of the invention and together with the description, serve to explain the principles of the invention.

BRIEF DESCRIPTION OF THE DRAWINGS

FIG. 3 illustrates effects of the operations of the present invention;

FIGS. 4A and 4B are graphic diagrams for comparing changes of camber and tread of the present invention with those of the conventional art.

DETAILED DESCRIPTION OF THE PREFERRED EMBODIMENTS

Figure 1:
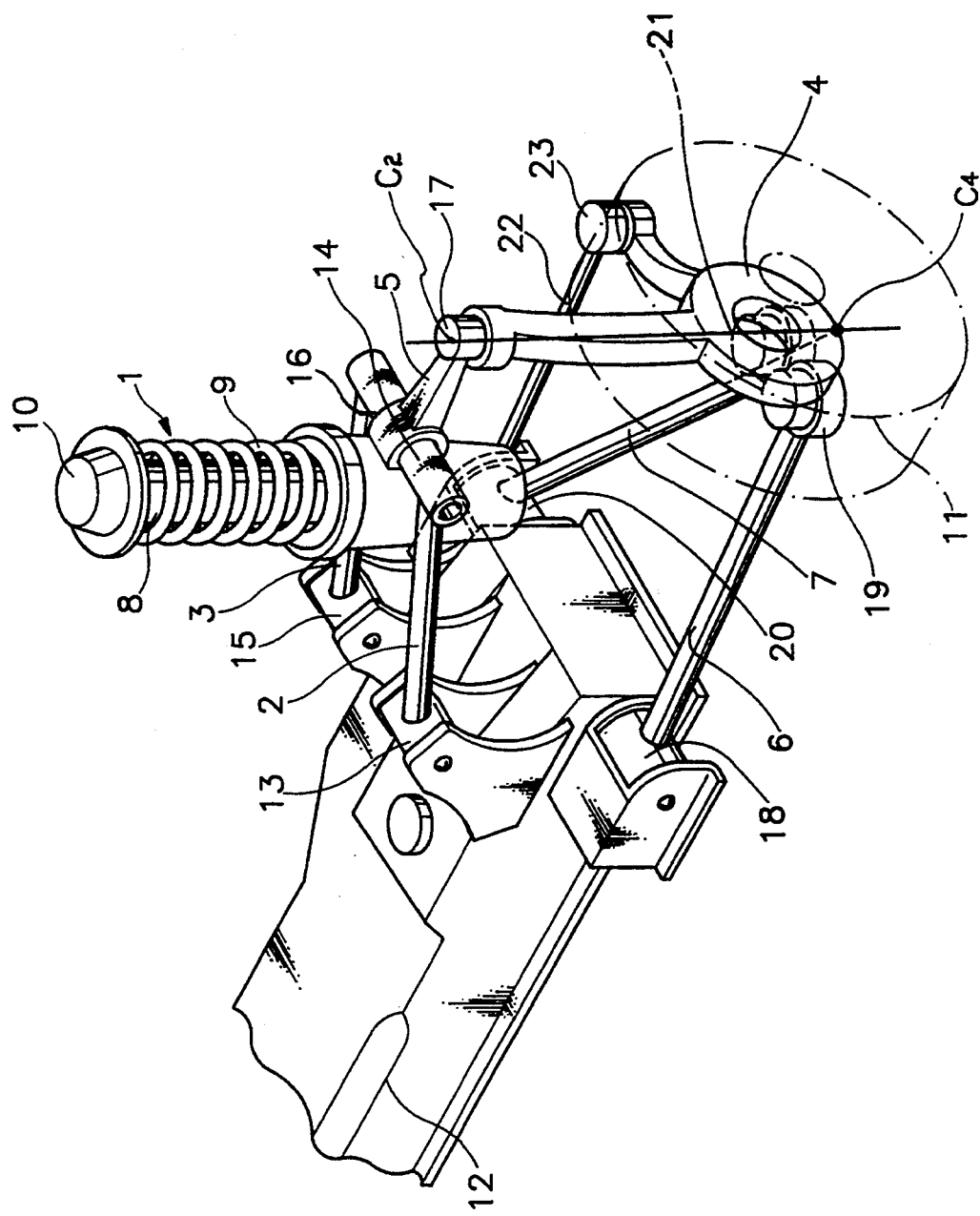
FIG. 1 is a perspective view of a suspension system of the present invention.

FIG. 1 is a perspective view of a suspension system of the present invention.

A strut arm 1 is an assembly of a shock-absorber 8 and a spring 9. An upper point of the strut arm 1 is connected to a vehicle body by an insulated connecting point 10, and a lower end is connected to a steering knuckle 4 through an integral connecting arm 5. The strut arm 1 supports the vehicle body, coping with up-and-down impacts applied from a wheel 11.

A pair of upper arms 2, 3 are made of the same length of circular bars, and connected to a cross member 12 of the vehicle body and the connecting arm 5 at connecting points 13, 14, 15, 16. The connecting points are located at the ends of both parallel upper arms by elastic bushes (not shown).

The connecting arm 5 is integrated with a lower part of the strut arm 1 and connected to an upper end of the steering knuckle 4 at the wheel side end by a ball joint 17. The connecting arm 5 relays forces transmitted from the wheel 11.

Positioning of the connecting points 14, 16 of the upper arms 2, 3 to connect to the connecting arm 5 and the ball joint 17 is merely a matter of layout, and does not adversely affect operations of the present invention.

In addition to the upper arms, a pair of lower arms 6, 7 are made of the same length of circular bars, and connected to the cross member 12 of the vehicle body and the steering knuckle 4 at connecting points 18, 19, 20, 21. Vehicle body side connecting points 18, 20 are connected to the cross member 12 with a side interval by elastic bushes, and the connecting points 19, 21 are connected to the steering knuckle 4, focused on a lower part of the steering knuckle 4 with a narrow interval by ball joints, totally formed into a triangle when viewing from the upper plane.

The positions of the vehicle body side connecting points 13, 15, 18, 20, and the wheel side connecting points 14, 16, 19, 21 of the upper 2, 3 and the lower arms 6, 7 are changeable in accordance with characteristics of desired suspension systems.

As an example in the preferred embodiment of the present invention, the pair of upper arms maintain a horizontal state, and the vehicle body side of the lower arms are illustrated as higher than the wheel side connecting points, but the arrangement illustrated is not limited within the embodiment.

An affixed mark 22 stands for a tie rod that controls the direction of the wheel, and is connected to the steering knuckle 4 by a ball joint 23.

Figure 2:
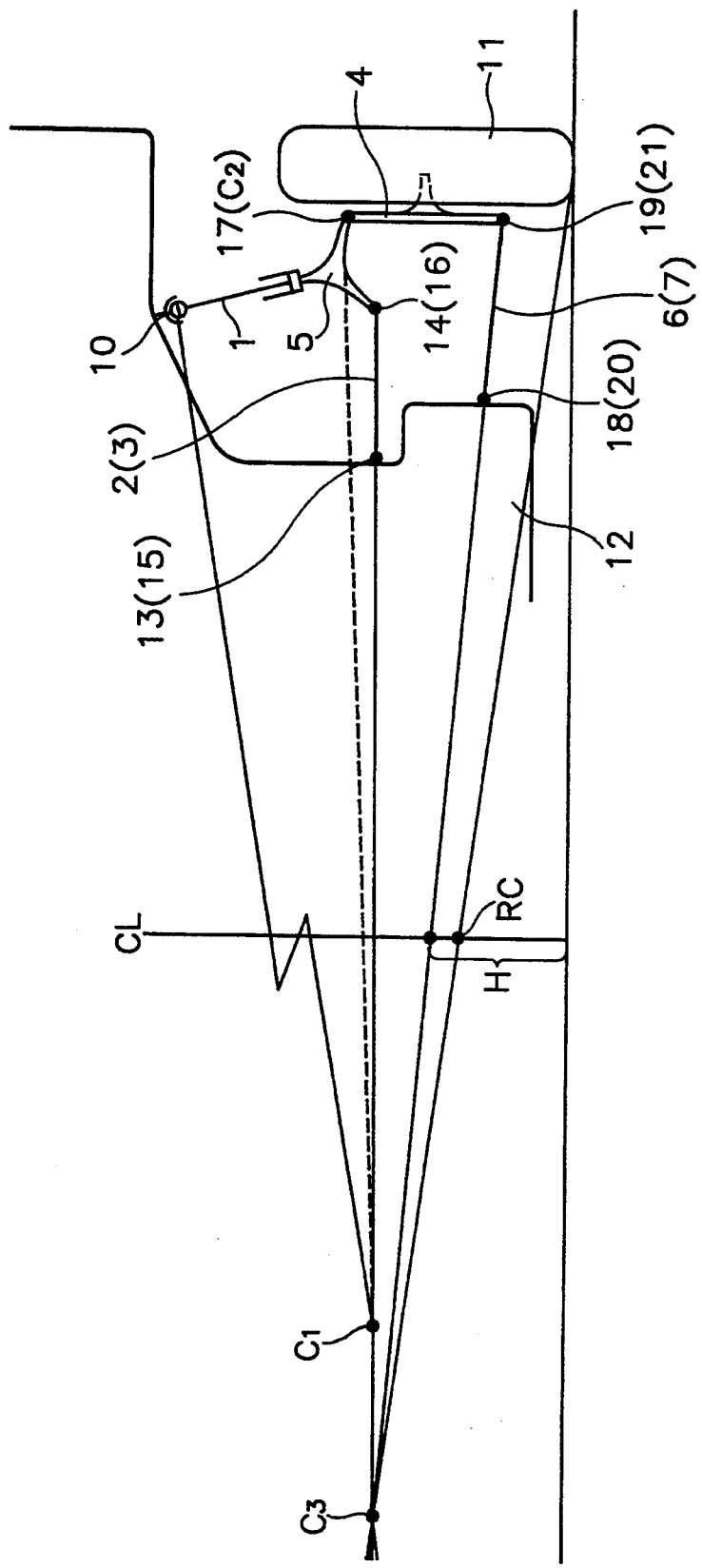
FIG. 2 is a front view for illustrating operations of the present invention.
Figure 5B:
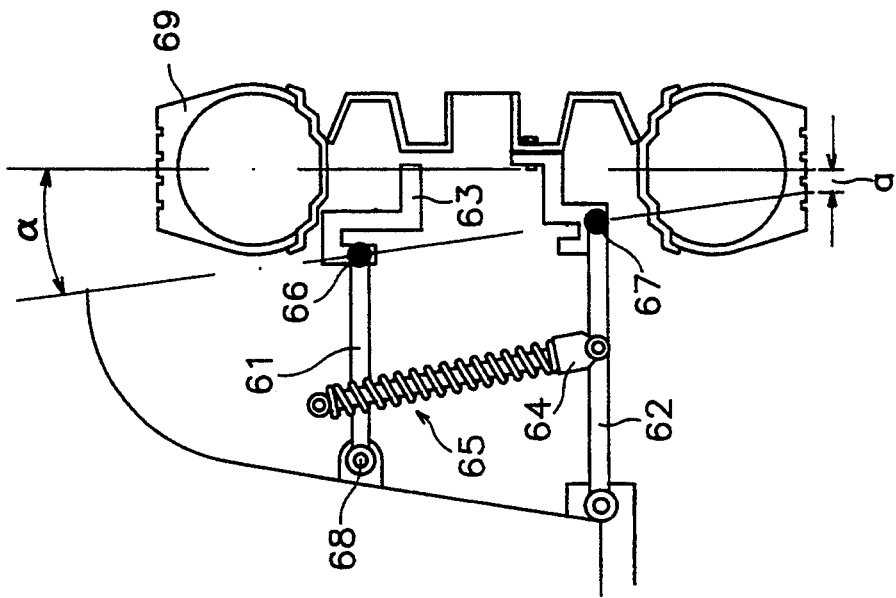
FIGS. 5A and 5B illustrate the conventional suspension systems.
Figure 5A:
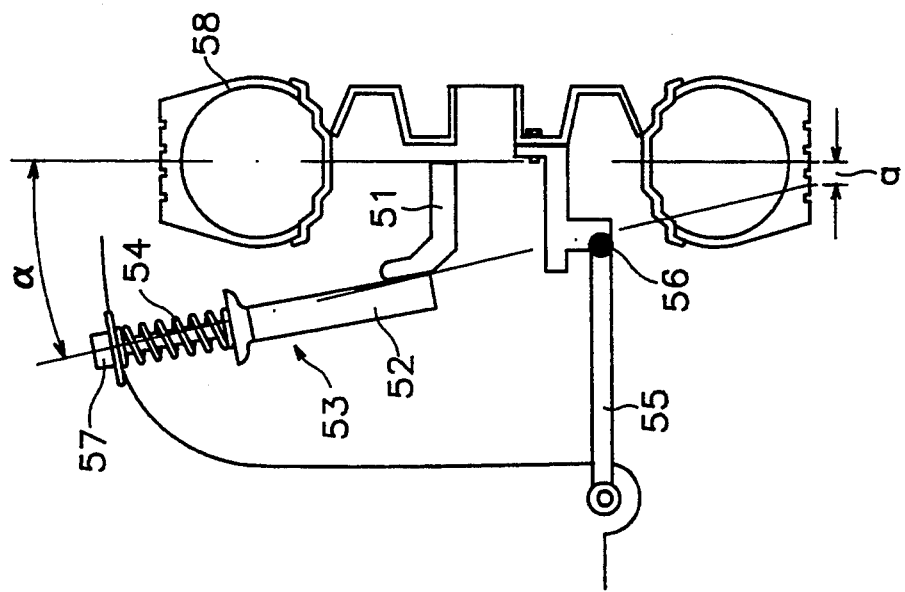

The operating effects of the present invention are described hereinbelow, referring to FIGS. 2 through 4.

As the connecting arm 5 rotates up and down centering the vehicle body side connecting points 13, 15 of the upper arms 2, 3 when the wheel 11 vibrates up and down or the vehicle body is rolling, an instantaneous center (C1) of the connecting arm 5 with respect to the vehicle body corresponds to an intersecting point of a vehicle body side extending line of the upper arms 2, 3 with a longitudinal line with respect to an axis of the strut arm 1, connected at the upper end connecting point 10.

The ball joint 17 connecting the steering knuckle 4 and the connecting arm 5 to each other is operating not only as a fixed hinge but also a moving hinge of the wheel, so an instantaneous center (C2) of the wheel 11 with respect to the connecting arm 5 is the connecting point 17 of the ball joint.

Accordingly, a segment line C1, C2 illustrated by a dotted line is an imaginary swing arm, that is, an imaginary upper arm.

In addition, an instantaneous center (C3) of the wheel with respect to the vehicle body is an intersecting point of the segment line C1, C2 with a vehicle body side extending line of lower arms 6, 7.

The imaginary upper arm C1, C2 is so long that a rotating angle of the segment line C1, C2 with respect to a vertical displacement of the instantaneous center C2 is very tiny as shown in FIG. 3. Therefore, the height change of the instantaneous center C1 is relatively small, and it means that the change in a height (H) of a roll center (RC) that is an intersecting point of a connecting line of a wheel tread with a center line (CL) of the vehicle body becomes small.

Accordingly, as the change in the height of the roll center (RC) becomes small, the running safety is relatively enhanced.

The kingpin axis is formed into a segment line connecting the connecting point 17 of the connecting arm 5 and the steering knuckle 4 as the instantaneous center (C2) to an intersecting point (C4) of two wheel side extending lines of the pair of lower arms 6, 7.

To reduce an offset (a) at the ground of an offset (b) at the wheel center, the projecting part of the connecting arm 5 should be shortened, or the wheel side connecting points 19, 21 should become narrow or short.

An inclination of the kingpin axis can optionally be reduced, so the change of a camber angle during the vehicle's turning can ideally be set up negatively (−) as a full line shown in FIG. 4A. And, according to the change in the camber angle, an ideal change in a tread is obtained as a full line in FIG. 4B, and so the running safety and ride comfort can be improved.

Additionally, as the kingpin offsets (a), (b) can be variously adjusted, the responsiveness with respect to the steering operation can also be reduced, and as a result, all sorts of operating safety including straight ahead safety can be improved.

In a general Macpherson type of suspension system, the spring should be eccentric with respect to the axis of the shock-absorber to avoid interfering with the vehicle body, and the full diameter should be large. As the strut arm itself rotates centering the kingpin axis, the strut arm should ensure a rotating space, to avoid interfering with the vehicle body. In the present invention, however, the upper side connecting point 10 of the strut arm 1 is positioned outward, so the effective volume of the engine room is enlarged.

According to the above-mentioned effects, a height of the vehicle body can be lowered. As a result, the driver's visual field can be heightened, and the hip point can be lowered.

When designing a vehicle, a centroid of the vehicle can be lowered, and an inertial moment around the kingpin axis is minimized to restrain a shimmy phenomenon.

As mentioned above, the present invention can improve the running safety by minimizing the change ratio of the roll center, the ride comfort by obtaining an ideal change of the camber angle and tread due to an easy setting-up of the kingpin axis, and all types of safety including straight ahead safety by reducing the responsiveness with respect to the steering operation due to an easy adjusting of kingpin offsets, as the free layout degree of the kingpin axis increases.

What is claimed is:

1. A vehicle suspension system for a steerable wheel comprising:
   a strut arm disposed vertically with respect to a vehicle body, and connected to a vehicle body by an insulator connecting part, said strut arm including a connecting arm projecting toward a wheel at a lower part of the strut arm;
   a pair of independently movable upper arms connected between the vehicle body and a vehicle body side of the connecting arm at opposing ends thereof, respectively;
   a steering knuckle for rotatably supporting the wheel by connection to a wheel side end of the connecting arm at an upper end by a ball joint, and a tie rod steerably connected to the steering knuckle; and
   a pair of lower arms independently and pivotally connected to the vehicle body at the vehicle body side ends and independently and pivotally connected to a wheel side lower part of the steering knuckle at wheel side ends by ball joints.

2. The suspension system according to claim 1, wherein said pair of upper arms are disposed parallel to each other between the vehicle body and the vehicle body side of the connecting arm with a predetermined interval therebetween.

3. The suspension system according to claim 1, wherein the wheel side connecting points of said pair of lower arms are connected to a lower part of the steering knuckle and in the same plane, and further connected to the vehicle body at the vehicle side ends thereof with vehicle body side connecting points widened with respect to the wheel side connecting points.

4. The suspension system according to claim 1, wherein the ball joint connection at the upper end of the steering knuckle is an instantaneous center of the steering knuckle with respect to the connecting arm.

5. The suspension system according to claim 1, wherein an intersecting point of an extending line connecting longitudinal axes of both of said pair of upper arms with a line intersecting a longitudinal axis of said strut arm at an upper end connecting point of the strut arm defines an instantaneous center of the connecting arm with respect to the vehicle body.

6. The suspension system according to claim 1, wherein a segment line connecting an instantaneous center of the connecting arm with respect to the vehicle body to an instantaneous center of the wheel with respect to the connecting arm is a working upper arm.

7. The suspension system according to claim 1, wherein a line connecting the upper end steering knuckle connection to an intersecting point of both extending lines of longitudinal axes of the pair of upper arms defines a working kingpin axis.

8. The suspension system according to claim 6, wherein a plurality of links are defined by each of said pair of upper arms and each of said pair of lower arms and connected so that an intersecting point of the working upper arm with the extending connecting both the wheel side end and vehicle body side end lines of said pair of lower arms defines an instantaneous center of the wheel with respect to the vehicle body.

9. The suspension system according to claim 8, wherein an intersecting point of a line connecting the instantaneous center of the wheel with respect to the vehicle body to a wheel tread with a center line of the vehicle body defines a working roll center.

* * * * *